(12) United States Patent
Brück et al.

(10) Patent No.: US 9,835,154 B2
(45) Date of Patent: Dec. 5, 2017

(54) PUMP FOR METERING A LIQUID ADDITIVE FOR A SELECTIVE CATALYTIC REDUCTION DEVICE

(71) Applicant: CONTINENTAL AUTOMOTIVE GMBH, Hannover (DE)

(72) Inventors: Rolf Brück, Bergisch Gladbach (DE); Jan Hodgson, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/786,336

(22) PCT Filed: Apr. 7, 2014

(86) PCT No.: PCT/EP2014/056888
§ 371 (c)(1),
(2) Date: Oct. 22, 2015

(87) PCT Pub. No.: WO2014/173666
PCT Pub. Date: Oct. 30, 2014

(65) Prior Publication Data
US 2016/0153450 A1    Jun. 2, 2016

(30) Foreign Application Priority Data

Apr. 26, 2013  (DE) .......... 10 2013 104 242

(51) Int. Cl.
*F01C 5/00* (2006.01)
*F04C 15/00* (2006.01)
(Continued)

(52) U.S. Cl.
CPC ........ *F04C 15/0003* (2013.01); *F01N 3/2066* (2013.01); *F04B 43/12* (2013.01);
(Continued)

(58) Field of Classification Search
CPC ......... F04B 43/12; F04B 43/123; F04B 43/14
See application file for complete search history.

(56) References Cited

U.S. PATENT DOCUMENTS

| | | | |
|---|---|---|---|
| 664,507 A | * | 12/1900 | Hinger ................ F04B 43/1238 417/476 |
| 2,906,143 A | * | 9/1959 | Walton .................. F16H 49/001 285/276 |

(Continued)

FOREIGN PATENT DOCUMENTS

| | | |
|---|---|---|
| CN | 85102462 | 9/1986 |
| DE | 41 19 083 | 12/1992 |

(Continued)

OTHER PUBLICATIONS

Office Action dated Aug. 29, 2016 which issued in the corresponding Chinese Patent Application No. 201480023189.4.

*Primary Examiner* — Jesse Bogue
(74) *Attorney, Agent, or Firm* — Cozen O'Connor

(57) ABSTRACT

A device providing a dosed supply of a liquid includes: a pump configured to deliver the liquid and having a pump housing with an inlet and an outlet; an eccentric on the pump housing; and a deformable diaphragm between the pump housing and the eccentric, the deformable diaphragm and the pump housing delimiting a delivery path from the inlet to the outlet and forming a seal of the delivery path. The seal is displaceable along the delivery path, by a movement of the eccentric, in a delivery direction from the inlet to the outlet to deliver the liquid. The pump is configured such that within the pump a friction torque that must be overcome for the eccentric to move is greater than a maximum pressure torque that can be generated by pressurized liquid in the delivery path, so as to prevent movement of the eccentric counter to the delivery direction.

10 Claims, 4 Drawing Sheets

(51) Int. Cl.
*F01N 3/20* (2006.01)
*F04B 43/12* (2006.01)
*F04B 43/14* (2006.01)
*F04C 5/00* (2006.01)
*F04C 2/34* (2006.01)
*F04C 2/22* (2006.01)

(52) U.S. Cl.
CPC ............ *F04B 43/123* (2013.01); *F04B 43/14* (2013.01); *F04C 2/34* (2013.01); *F04C 5/00* (2013.01); *F01N 2610/02* (2013.01); *F01N 2610/1433* (2013.01); *F04C 2/22* (2013.01); *Y02T 10/24* (2013.01)

(56) References Cited

U.S. PATENT DOCUMENTS

| | | | | |
|---|---|---|---|---|
| 3,408,947 A | * | 11/1968 | McMillan | F04C 5/00 418/45 |
| 3,549,279 A | | 12/1970 | Grach | |
| 3,687,580 A | * | 8/1972 | Griffiths | F03C 7/00 417/476 |
| 4,332,534 A | | 6/1982 | Becker | |
| 4,390,328 A | * | 6/1983 | Fickelscher | F01C 1/3566 418/153 |
| 5,006,049 A | * | 4/1991 | von der Heyde | F04C 5/00 417/476 |
| 2007/0253835 A1 | * | 11/2007 | Habr | F04B 43/12 417/211 |
| 2013/0323083 A1 | | 12/2013 | Maguin et al. | |

FOREIGN PATENT DOCUMENTS

| | | |
|---|---|---|
| DE | 602 09 406 | 9/2006 |
| DE | 10 2007 020 573 | 11/2008 |
| DE | 10 2011 010644 A1 | 8/2012 |
| GB | 744 414 A | 2/1956 |
| GB | 768 253 A | 2/1957 |

\* cited by examiner

PUMP FOR METERING A LIQUID ADDITIVE FOR A SELECTIVE CATALYTIC REDUCTION DEVICE

CROSS-REFERENCE TO RELATED APPLICATIONS

This is a U.S. national stage of application No. PCT/EP2014/056888, filed on 7 Apr. 2014, which claims priority to the German Application No. DE 10 2013 104 242.2 filed 26 Apr. 2013, the content of both incorporated herein by reference.

BACKGROUND OF THE INVENTION

1. Field of the Invention

The invention relates to a device for the dosed supply of a liquid.

2. Related Art

A device of this type may also be referred to as delivery device and/or as dosing device. A device of this type may be used, for example, in a motor vehicle to feed a liquid additive for exhaust-gas purification to an exhaust-gas treatment device of the motor vehicle. In exhaust-gas treatment devices requiring a liquid additive for operation, the method of selective catalytic reduction (SCR), for example, is implemented. In this method, nitrogen oxide compounds in the exhaust gas of an internal combustion engine are reduced with the aid of a reducing agent. Ammonia is commonly used as reducing agent. Ammonia is normally stored in motor vehicles not directly but in the form of a reducing agent precursor solution, which is stored as a liquid in a tank and which is supplied by way of a corresponding device, which may be operated in accordance with the method described here. A liquid that is particularly commonly used in this context is urea-water solution which, for the purposes of exhaust-gas purification, is available under the trade name AdBlue® with a urea content of 32.5%.

For successful exhaust-gas purification, highly accurately dosed metering of the liquid into an exhaust-gas treatment device is desired, that is to say the amount of liquid metered corresponds as accurately as possible to a requirement in the exhaust-gas treatment device. Furthermore, a device for the dosed supply of a liquid should be producible and operable as inexpensively as possible, and should as far as possible not be able to be damaged by liquid freezing within the device, because the described (aqueous) liquids can freeze at low temperatures. In motor vehicles, low temperatures arise for example during relatively long standstill phases.

For the delivery of such liquids, devices which have a non-branched delivery line from a tank to an injector at an exhaust-gas treatment device have proven to be particularly advantageous. Such devices for providing a supply typically do not have a return line which permits circulation of liquid through the device and back into the tank. A return line of this type was provided because it was possible for air bubbles in the device to be easily and reliably removed via the return line. However, a return line of this type entails increased cost expenditure.

The dosing (i.e., metering) of the liquid by way of the device is preferably performed with the aid of an injector (dosing valve), which can be opened and closed in electronically actuated fashion. The amount of liquid dispensed by the device is in this case typically proportional to the opening time of the injector. For this purpose, the pressure of the liquid prevailing at the injector must correspond as accurately as possible to a target pressure, because the amount of liquid dosed by an injector during a predefined opening time exhibits a high dependency on the pressure of the liquid at the injector.

Between multiple individual dosing processes of the injector, it is desirable for the pressure of the liquid in a pressure line section between a pump and the injector to be kept substantially constant in order that the injector can dose liquid in the desired manner immediately when a dosing demand is placed on the injector.

Devices for the supply of a liquid typically have at least one pump for the delivery of the liquid and for maintaining the pressure at the injector. However, the pumps used for such devices typically have the disadvantage that a backflow of liquid can occur through the pump. As a result of this backflow, the pressure at the injector is falsified, and thus the dosing accuracy is reduced.

SUMMARY OF THE INVENTION

Taking this as a starting point, it is an object of the present invention to solve or at least alleviate the technical problems highlighted in connection with the prior art. It is sought in particular to disclose a device for the dosed supply of a liquid, by which device precise dosing of the liquid is possible, wherein the energy consumption of the device is as low as possible, and the device is as inexpensive as possible.

In accordance with one aspect of the present invention, a device for the dosed supply of a liquid is has at least having at least one pump for delivering the liquid, the at least one pump having a pump housing with at least one inlet and at least one outlet. An eccentric is arranged on the pump housing and a deformable diaphragm is arranged between the pump housing and the eccentric. The deformable diaphragm and the pump housing delimit at least one delivery path from the at least one inlet to the at least one outlet and form at least one seal of the delivery path. The at least one seal is displaceable along the delivery path in a delivery direction from the at least one inlet to the at least one outlet by way of a movement of the eccentric for the purposes of delivering the liquid, wherein, within the at least one pump, a friction torque arises that must be overcome in order for the eccentric to move, wherein the friction torque is greater than a maximum pressure torque that can be generated by pressurized liquid in the delivery path, such that a movement of the eccentric counter to the delivery direction is prevented.

The device preferably has a suction line extending from the at least one pump to a tank in which the liquid is stored. The suction line is preferably connected to the inlet of the pump. The device preferably furthermore has a pressure line which extends from the pump to a metering point for the metering of the liquid into an exhaust-gas treatment device. The pressure line is connected to the outlet of the pump. It is also possible for multiple (parallel) suction lines to lead to multiple pumps (for example of different delivery power), which pumps are in each case connected (in particular in non-branched fashion) via pressure lines to an individual injector or to multiple injectors. Further branchings of the line system of the device are preferably not provided. In particular, there is preferably no return line that produces a connection of the outlet of the pump back to the tank.

A pump with the described construction can be referred to as an orbital pump. The delivery path is formed by a gap between the deformable diaphragm and the pump housing. The deformable diaphragm is preferably arranged between the eccentric and the pump housing such that the deformable diaphragm is pinched between the housing and the eccentric in the region of the at least one seal. The gap between the deformable diaphragm and the pump housing is thereby closed in fluid-tight fashion in the region of the at least one seal. The gap or the delivery path is filled with the liquid during the operation of the device. Along the delivery path, the at least one seal divides the delivery path, such that at least one (closed) delivery volume is formed. As a result of the displacement of the seal by way of a movement of the eccentric, the delivery volume is displaced in a delivery direction proceeding from the inlet of the pump toward the outlet of the pump. In this way, delivery of the liquid is performed.

The pump housing of the pump is preferably a ring or a cylindrical chamber in which the eccentric is arranged (centrally) at the inside. The pump housing may then be regarded as an (external) stator of the pump, whereas the eccentric can be referred to as an (internal) rotor. In a further embodiment of the described pump, it is however also possible for the pump housing to form an internal stator of the pump, which is surrounded by the eccentric. The eccentric then forms an external rotor. The inlet and the outlet are arranged on the pump housing and permit the inflow of the liquid into, and the outflow of the liquid out of, the pump housing or the delivery path between the deformable diaphragm and the pump housing.

On the pump, there is preferably also provided a partition which prevents an undesired backflow of the liquid from the outlet to the inlet. This partition may, for example, be in the form of a depression in the pump housing or of a thickened portion of the deformable diaphragm. The partition is arranged (permanently or in positionally fixed fashion) between the outlet and the inlet of the pump. The partition prevents a direct connection for the liquid from the outlet to the inlet from being formed at any time as a result of the movement of the eccentric relative to the pump housing. The partition can also be ensured by virtue of the deformable diaphragm being braced, screwed or adhesively bonded to the housing between the outlet and the inlet.

The eccentric is preferably of multi-part form. The eccentric preferably has an (inner) eccentric region, which performs an eccentric rotational movement, and an (outer) bearing ring, which surrounds the eccentric region. It is preferable for at least one bearing to be situated between the eccentric region and the bearing ring. The bearing may be a ball bearing or a roller bearing. The eccentric region of the eccentric performs a rotational movement about an axis of rotation during operation. An external shape of the eccentric yields an eccentric movement of a surface of the eccentric region. The eccentric movement is transmitted to the bearing ring. The bearing between eccentric region and bearing ring prevents the rotational movement of the eccentric region from being transmitted, together with the eccentric movement, to the bearing ring. Through the combination of an eccentric region and of a bearing ring with bearing arranged in between, an eccentric rotational movement of the eccentric region can be converted into an eccentric wobbling movement of the bearing ring without a rotational movement component. The fact that the movement of the bearing ring does not have a rotational movement component makes it possible for shear stresses in the deformable diaphragm to be reduced. It is preferably the case that the deformable diaphragm is merely flexed by the eccentric. It is preferably the case that only pressure forces, and substantially no friction forces, act at a contact surface of the eccentric with the deformable diaphragm, which friction forces would arise as a result of friction of the eccentric against the diaphragm if the contact surface with the deformable diaphragm were to also exhibit a rotational movement component. A corresponding division of the eccentric into an eccentric region and a bearing ring is also possible if the eccentric is an external rotor arranged around a housing which forms an internal stator. Such a division with an eccentric region and a bearing ring is however not required for all design variants of a described pump.

The pressurized liquid in the delivery path exerts pressure forces on the eccentric and on the deformable diaphragm. Depending on the orientation of the eccentric, the pressure forces may act with a radial direction and/or with a tangential direction. Here, radial pressure forces are directed toward the axis of rotation of the eccentric, whereas tangential pressure forces run tangentially with respect to the axis of rotation of the eccentric. Tangential pressure forces generate a pressure torque, which acts on the eccentric and which is suitable for setting the eccentric in rotation. A corresponding pressure torque can also generate a rotation which opposes the delivery direction of the eccentric. Such a rotation causes the pressure generated by the pump in the pressure line section to be reduced.

The described friction torque prevents the pressure torque exerted on the eccentric by the pressurized liquid in the delivery path from actually independently displacing or rotating the eccentric when the drive of the pump is deactivated. This is advantageous in particular in order to maintain the pressure in a pressure line, which is connected to the outlet of the pump, between multiple dosing processes by the device, without an activation of the drive being necessary for this purpose. Therefore, the described device can be operated with particularly low energy usage, specifically when small dose amounts of liquid are demanded and/or when there is a large time interval between two dosing demands.

The device is furthermore advantageous if the deformable diaphragm bears at least against the pump housing or against the eccentric with a friction coefficient and a normal force, and the friction coefficient and the normal force result in the (tangential) friction torque.

In addition, further forces and/or torques may arise within the pump which assist the described friction torque. The generation of the friction torque by way of frictional contact may be selectively realized at a contact surface between the deformable diaphragm and the pump housing or at a contact surface between the deformable diaphragm and the eccentric, depending on which of the two contact surfaces a tangential relative movement occurs at. The generation of the friction torque between the diaphragm and the pump housing is therefore suitable in particular for pumps in which the entire eccentric is rotated, and the eccentric is not divided into an inner eccentric region and an outer bearing ring with a bearing arranged in between.

The device is furthermore advantageous if the eccentric is constructed with an inner eccentric region, an outer bearing ring, and a bearing arranged in between, and the friction torque is formed by internal friction in the bearing.

Such a division of the eccentric has already been described further above, such that, in this regard, reference is also made to this description. The internal friction in the bearing may be generated, for example, by a plastics insert in the bearing, which plastics insert generates, for the bearing bodies of the bearing, a defined force that must be overcome in order for the bearing to permit a relative movement. It is also possible for the friction torque to be generated by a roughened region of the bearing shells or a similar structure. The generation of the friction torque within the bearing can be generated retroactively in a particularly effective manner in the case of a pump. For this purpose, it is, for example, possible for the described plastics insert to be inserted into the bearing or for a corresponding bearing with a defined rolling resistance to be used.

The device is furthermore advantageous if the at least one pump has a drive unit, and the friction torque is formed by internal friction in the drive unit.

The drive unit is normally an electric motor to which the eccentric is connected via a shaft and which can set the eccentric in motion for the delivery action. The internal friction at the drive unit may likewise be generated by a suitable insert in the drive unit or by a suitable design of the bearing arrangements of the drive unit. The drive unit is typically an electric motor. It is also possible for the friction torque to be formed as a result of the contact of the electrical contacts within an electric drive unit. In order that the friction torque can be formed in the drive unit, provision is made for the drive unit to be configured correspondingly. For this purpose, it is possible, for the pump, to use a drive unit that has an internal friction torque which corresponds to the given requirements.

The device is furthermore advantageous if the maximum (tangential) pressure force is formed on the basis of a maximum working pressure of the at least one pump and a maximum encountered cross section of the delivery path of the at least one pump.

The cross section of the delivery path is defined by the gap between the deformable diaphragm and the pump housing. Here, the gap means the liquid-filled volume between the deformable diaphragm and the pump housing. The point at which the gap is at its widest forms the maximum encountered cross section of the delivery path. The pressure acting on the cross section generates the force that effects the pressure torque.

The device is particularly preferable if the maximum cross section of the delivery path is smaller than 20 mm² [square millimeters].

Furthermore, the device is advantageous if the maximum working pressure of the pump lies between 5 bar and 10 bar.

If the pump is designed such that the maximum cross section of the delivery path is smaller than 20 mm², it can be ensured that the maximum pressure torque that arises in the presence of normal operating pressures in a range from 5 to 10 bar is no higher than the friction torque, wherein the friction torque is at the same time low enough that the eccentric of the pump can be driven with a relatively low drive force. The diameter of the pump is also relevant for the acting pressure torque. The greater the diameter of the delivery path between the deformable diaphragm and the pump housing, the greater the acting torque. The diameter of the delivery path is preferably less than 80 mm [millimeters], and is particularly preferably between 40 mm and 70 mm.

The device is furthermore advantageous if at least one of the following parameters of the at least one pump is configured such that the tangential friction force is greater during a movement of the eccentric counter to the delivery direction than during a movement of the eccentric in the delivery direction:
  a friction coefficient between that housing surface of the pump housing directed toward the delivery path and that diaphragm surface of the deformable diaphragm directed toward the delivery path;
  a friction coefficient between the deformable diaphragm and the eccentric;
  a friction torque in a bearing of the eccentric of the at least one pump; and
  a friction torque in a drive unit of the at least one pump.

During the normal delivery of liquid from the tank to an injector, the eccentric is moved in the delivery direction. It is therefore expedient for the eccentric to have a low friction resistance in the direction of movement. In this way, the energy consumption during the operation of the pump can be minimized. A backward movement counter to the delivery direction should nevertheless be prevented, for the reasons discussed above. The friction torque must therefore have an (increased) minimum value in this direction. An additional requirement may be that a movement of the eccentric counter to the delivery direction should nevertheless be made possible for the purposes of back-suction of the liquid or for the evacuation of the delivery path. During an evacuation, the pump is operated counter to the delivery direction in order to draw air into the device through the metering device or through the injector and to deliver the liquid out of the device. In relation to the delivery action, back-suction is however necessary only relatively seldomly, such that increased energy losses during the back-suction owing to the increased friction coefficient are acceptable.

It is desirable for a suitable compromise between high reliability of prevention of an undesired movement of the eccentric and simultaneous assurance of back-suction capability to be reached through corresponding configuration of the friction torque.

The device is furthermore advantageous if, at least at one of the following positions within the at least one pump, a barb structure is provided so as to have the effect that the friction torque is greater counter to the delivery direction than in the delivery direction:
  on a housing surface, directed toward the delivery path, of the pump housing;
  on a diaphragm surface, directed toward the delivery path, of the deformable diaphragm;
  on a diaphragm surface, directed toward the eccentric, of the deformable diaphragm;
  on a surface, directed toward the deformable diaphragm, of the eccentric;
  in a bearing of the eccentric of the at least one pump; and
  in a drive unit of the at least one pump.

A barb structure is preferably designed such that it does not jam absolutely firmly when the drive of the pump or of the eccentric is moved counter to the delivery direction. The barbs constitute an increased resistance only to a movement counter to the delivery direction. This may be realized, for example, by virtue of the barbs folding over, and then permitting a movement counter to the delivery direction, when the acting force exceeds a threshold value, wherein the resistance force actually arising during the movement may even be reduced in relation to the resistance force that acts in the standstill state so as to oppose the movement. The barbs may, for example, be formed as a type of sawtooth structure of a surface, which can be easily passed over in the delivery direction and which can be passed over only with difficulty counter to the delivery direction.

Also proposed is a motor vehicle, at least having an internal combustion engine, an exhaust-gas treatment device for the purification of the exhaust gases of the internal combustion engine, and a device for delivering a liquid to the exhaust-gas treatment device, wherein the liquid is urea-water solution.

In the exhaust-gas treatment device there is preferably provided an SCR catalytic converter by which nitrogen oxide compounds in the exhaust gas of the internal combustion engine can be reduced with the aid of the liquid. The device in the motor vehicle may have all of the device features described here. The motor vehicle preferably also has a control unit connected at least to the at least one pump of the device and possibly also to an injector for the metering of the liquid into an exhaust-gas treatment device, and by which a dosing process for the dosing of liquid into the exhaust-gas treatment device can be performed by way of the device. For this purpose, the control unit preferably has corresponding stored program routines.

BRIEF DESCRIPTION OF THE DRAWINGS

The invention and the technical field will be explained in more detail below on the basis of the figures. The figures show particular exemplary embodiments, to which the invention is however not restricted. In particular, it should be noted that the figures and in particular the proportions illustrated in the figures are merely schematic. In the figures.

DETAILED DESCRIPTION OF THE PRESENTLY PREFERRED EMBODIMENTS

Figure 1:
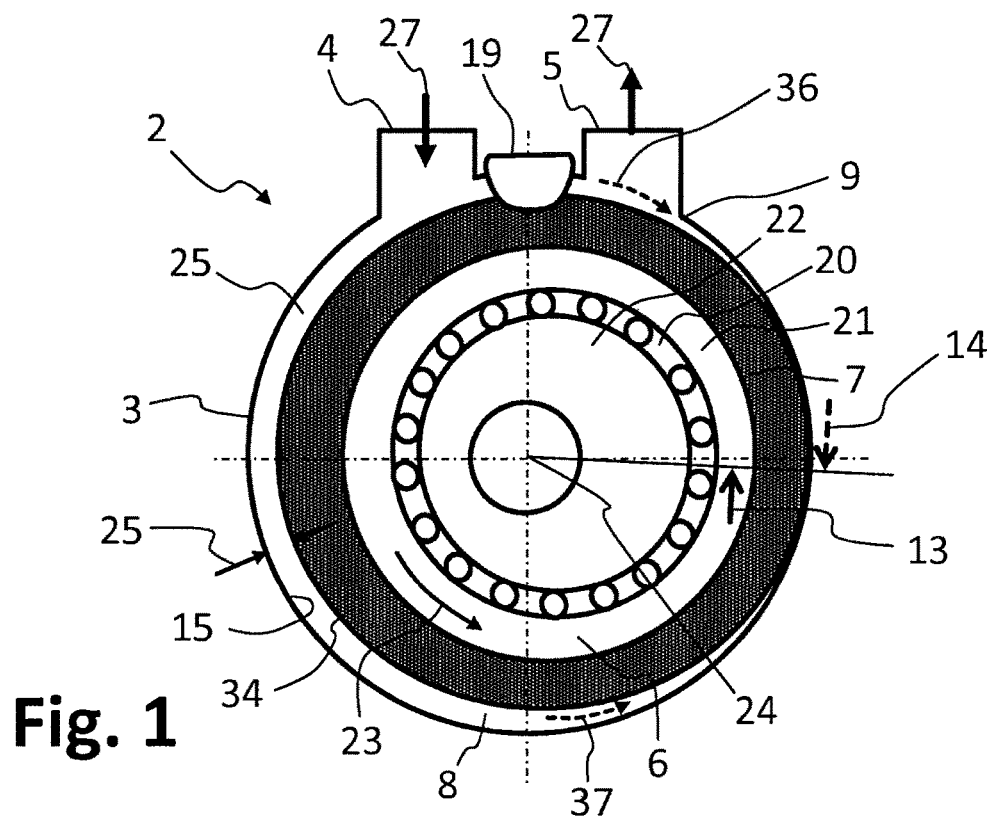
FIG. 1: shows a pump for a described device.

FIG. 1 illustrates a pump 2 having a pump housing 3 with an inlet 4 and an outlet 5. An eccentric 6 is arranged within the pump housing 3. The deformable diaphragm 7 is situated between the eccentric 6 and the pump housing 3. Between the deformable diaphragm 7 and the pump housing 3 there is a delivery path 8, which runs from the inlet 4 to the outlet 5. The delivery path 8 is sealed off (closed off) at one point by a seal 9. At the seal 9, the deformable diaphragm 7 bears directly against the pump housing 3. The seal 9 can be displaced by way of an eccentric movement of the eccentric 6. This gives rise to a delivery of the liquid in a delivery direction 27 from the inlet 4 to the outlet 5. The eccentric 6 is divided into an inner eccentric region 22 and an outer bearing ring 21. The inner eccentric region 22 is separated from the outer bearing ring 21 by a bearing 20. When the eccentric region 22 is rotated about the shaft 24 in a direction of rotation 23 corresponding to the delivery direction 27, the bearing ring 21 performs the described eccentric movement. Between the inlet 4 and the outlet 5 there is provided a (positionally fixed, permanent) partition 19, which in this case is in the form of a cam that locally compresses the deformable diaphragm 7. The partition 19 prevents a backflow of the liquid from the outlet 5 back to the inlet 4.

During operation, the liquid is present within the delivery path 8 with a particular pressure. The pressure is considerably lower in those regions of the delivery path 8 that are connected to the inlet 4 than in those regions of the delivery path 8 that are connected to the outlet 5.

In the illustration of a design variant of the pump 2 as per FIG. 1, an outlet pressure force 36 acts in a part of the delivery path 8 connected to the outlet 5 of the pump 2. An inlet pressure force 37 acts in a part of the delivery path 8, connected to an inlet 4, of the pump. The inlet pressure force 37 is much lower than the outlet pressure force 36, because the pressure in that part of the delivery path 8 connected to the inlet 4 is much lower than the pressure in that part of the delivery path 8 which is connected to the outlet 5. This gives rise to a resultant pressure torque 14. The resultant pressure torque 14 is opposed by a friction torque 13. The way in which the friction torque 13 is generated is not illustrated in detail in FIG. 1. The friction torque 13 may, for example, be the result of internal friction in the bearing 20 and/or the result of internal friction in the drive (not illustrated here) of the pump 2, which drive is connected via the shaft 24 to that part of the pump 2 which is illustrated in FIG. 1.

Figure 2:
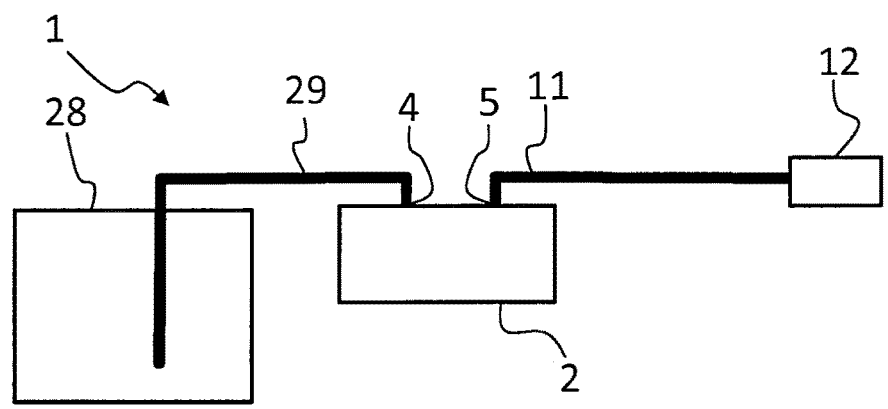
FIG. 2: shows a described device.

FIG. 2 shows a device 1 for the dosed supply of a liquid, having a (single) pump 2 connected via a (single) suction line 29 to a tank 28, wherein the suction line 29 is connected to a (single) inlet 4 of the pump. Furthermore, the device has a (single) injector 12 for the dosed dispensing of the liquid, the injector being connected via a (single, non-branched) pressure line 11 to a (single) outlet 5 of the pump 2.

Figure 3:
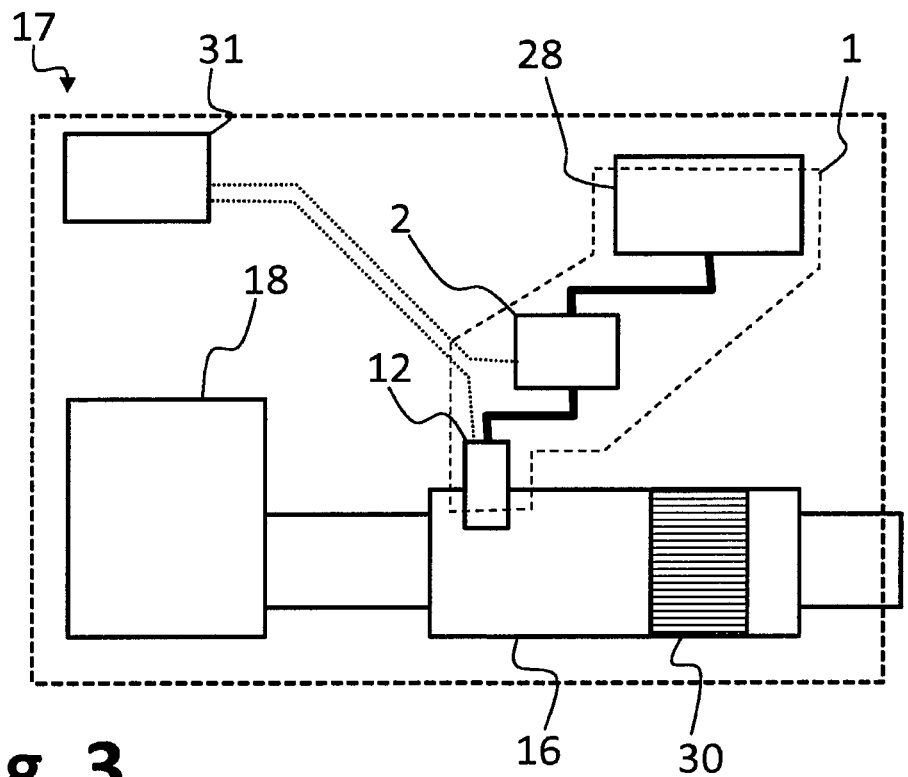
FIG. 3: shows a motor vehicle having a described device.

FIG. 3 shows a motor vehicle 17 having an internal combustion engine 18 and an exhaust-gas treatment device 16. The exhaust-gas treatment device 16 purifies the exhaust gases of the internal combustion engine 18, and for this purpose, has an SCR catalytic converter 30 by which the method of selective catalytic reduction can be implemented. For this purpose, the exhaust-gas treatment device 16 is supplied with liquid for exhaust-gas purification (in particular urea-water solution) by a device 1, wherein the device 1 has a pump 2 which delivers the liquid from the tank 28 to the injector 12. The pump 2 and the injector 12 are connected to a control unit 31 of the motor vehicle 17. In the control unit 31 there may be stored control routines with which the operation of the device 1 is controlled.

Figure 4:
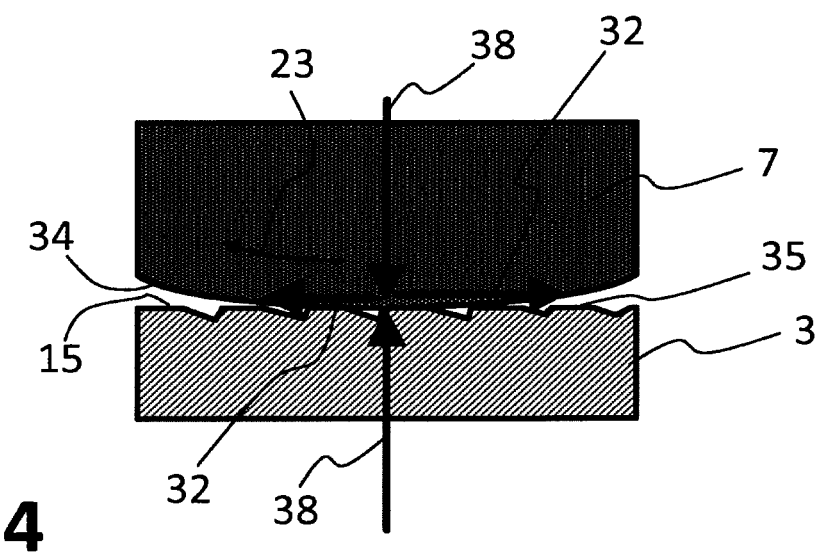
FIG. 4: shows a schematic illustration of a point of frictional contact within a described device.

FIG. 4 schematically illustrates a point of frictional contact, such as may exist, for example, between the deformable diaphragm 7 and the pump housing. The pump housing 3 has a housing surface 15, and the deformable diaphragm 7 has a diaphragm surface 34. The deformable diaphragm 7 and the pump housing 3 are pressed against one another with a normal force 38. Furthermore, a friction coefficient exists between the diaphragm surface 34 and the housing surface 15. By way of a barb structure 35 on the diaphragm surface 34, it is ensured that the friction coefficient is lower in the direction of rotation 23 than counter to the direction of rotation 23, such that the respectively resultant friction force 32 is lower in the direction of rotation 23 than counter to the direction of rotation 23. The illustration, shown in FIG. 4, of a point of frictional contact is applicable to all possible arrangements of a barb structure 35 on the pump housing 3, on the eccentric 6 and on the deformable diaphragm 7.

Figure 5:
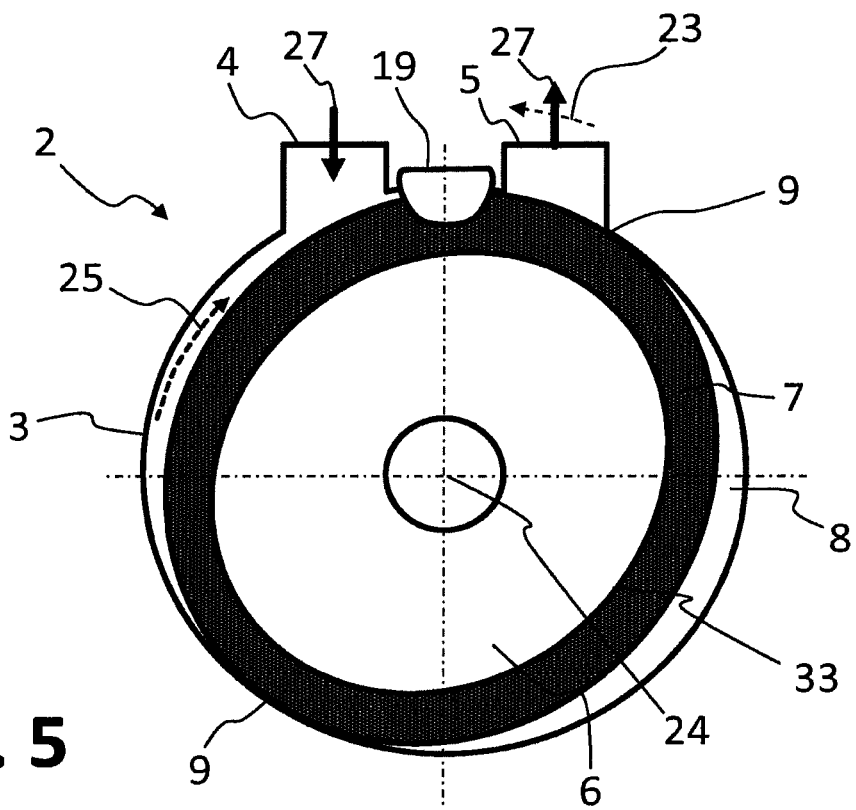
FIG. 5: shows a second design variant of a pump for a described device.

FIG. 5 shows a second design variant of a pump 2 for a described device, which differs from the pump illustrated in FIG. 1 in that the eccentric 6 and the deformable diaphragm 7 form two seals 9, which are moved along the delivery path 8 as a result of a rotational movement of the eccentric 6 relative to the pump housing 3. In the case of this pump 2, however, there is no division of the eccentric 6 into a bearing ring and an eccentric region. In this design variant, the eccentric 6 rotates such that, at a contact surface 33 between the eccentric 6 and the deformable diaphragm 7, defined friction forces arise that are avoided by a corresponding configuration of the contact surface 33.

Figure 6:
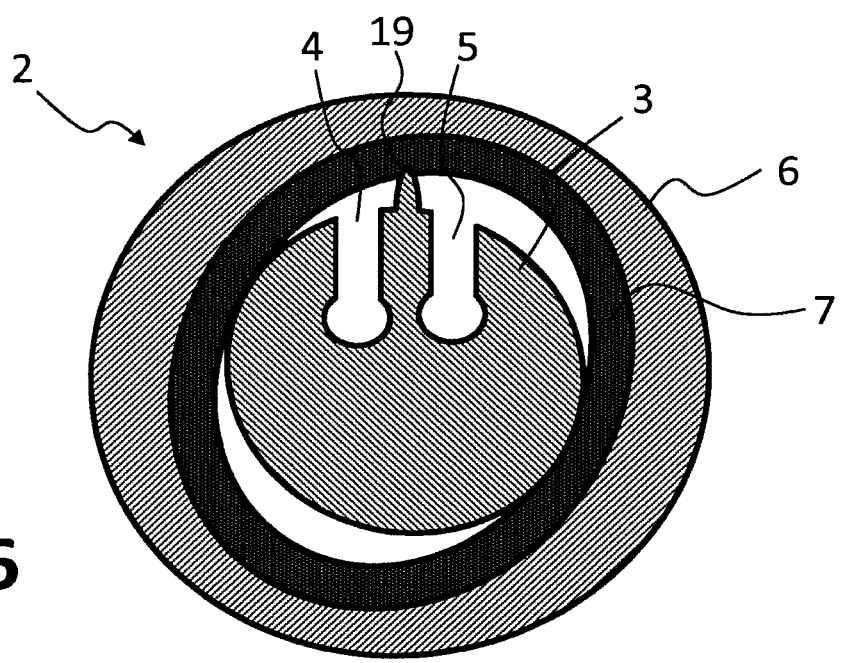
FIG. 6: shows a third design variant of a pump for a described device.

FIG. 6 shows, in highly simplified form, a further design variant of a pump 2, in which the pump housing 3 is arranged at the inside and the eccentric 6 is arranged around the pump housing 3 at the outside. Here, too, the deformable diaphragm 7 is situated between the pump housing 3 and the eccentric 6. The inlet 4 and the outlet 5 are arranged on the pump housing 3, and a (positionally fixed, permanent) partition 19 is provided for preventing a backflow of the liquid from the outlet 5 to the inlet 4.

Figure 7:
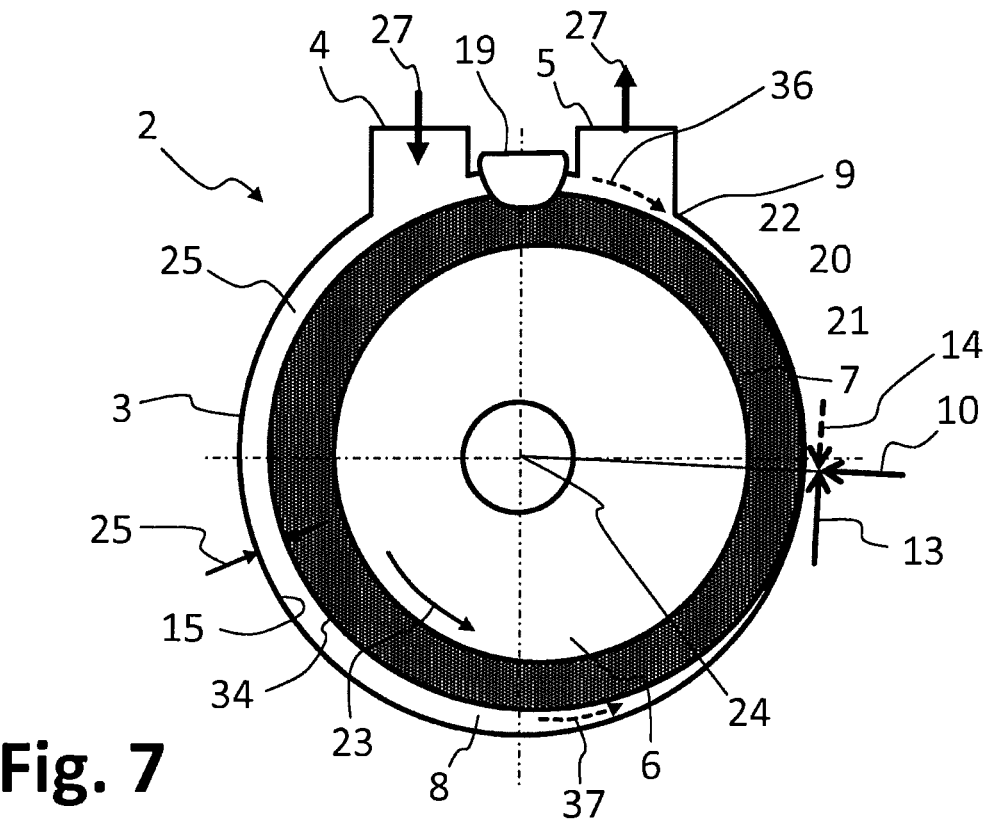
FIG. 7: shows a fourth design variant of a pump for a described device.

FIG. 7 shows a fourth design variant of a pump 2, in the case of which the eccentric 6 is not divided into an eccentric region and a bearing ring with a bearing arranged in between. Here, the deformable diaphragm 7 rubs directly against the pump housing 3, such that frictional contact exists between the deformable diaphragm 7 and the pump housing 3, which frictional contact gives rise to the friction torque.

Figure 8:
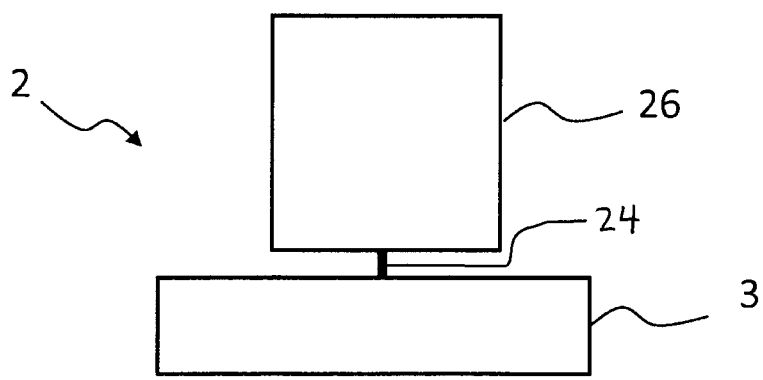
FIG. 8: is a schematic illustration of a drive unit of a pump.

The pump 2 is illustrated in simplified and schematic form in FIG. 8. It can be seen here that the pump has the pump housing 3 in which the eccentric (not illustrated here) is arranged. The eccentric is connected to the drive unit 26 of the pump via the shaft 24.

By way of precaution, it should also be noted that the combinations of technical features shown in the figures are not generally binding. For example, technical features from one figure may be combined with other technical features from a further figure and/or from the general description. The only exception to this is if the combination of features has been explicitly referred to here and/or a person skilled in the art identifies that the basic functions of the device can no longer be realized otherwise.

The described device permits particularly accurate dosing of liquid, and in particular even of small amounts of the liquid. At the same time, the device is particularly inexpensive, and requires particularly little energy for the delivery and dosing actions.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device (1) providing a dosed supply of a liquid, the device (1) comprising:
at least one pump (2) configured to deliver the liquid, the at least one pump (2) having a pump housing (3) with at least one inlet (4) and at least one outlet (5);
an eccentric (6) arranged on the pump housing (3);
a deformable diaphragm (7) arranged between the pump housing (3) and the eccentric (6), the deformable diaphragm (7) and the pump housing (3) delimiting at least one delivery path (8) from the at least one inlet (4) to the at least one outlet (5) and forming at least one seal (9) of the delivery path (8); and
a barb structure (35), the barb structure being arranged on at least one selected from the group: (a) the pump housing (3), (b) the eccentric (6), and (c) the deformable diaphragm (7),
wherein the at least one seal (9) is displaceable along the delivery path (8), by a movement of the eccentric (6), in a delivery direction (27) from the at least one inlet (4) to the at least one outlet (5) to deliver the liquid,
wherein the at least one pump (2) is configured such that within the at least one pump (2) a friction torque (13) that must be overcome for the eccentric (6) to move is greater than a maximum pressure torque (14) that can be generated by pressurized liquid in the at least one delivery path (8), so as to prevent movement of the eccentric (6) counter to the delivery direction (27), and
wherein the barb structure (35) is configured to contribute to the friction torque (13).

2. The device (1) as claimed in claim 1, wherein the deformable diaphragm (7) bears at least against the pump housing (3) or against the eccentric (6) with a friction coefficient and a normal force (10), the friction coefficient and the normal force (10) resulting in the friction torque (13) within the at least one pump (2).

3. The device (1) as claimed claim 1, wherein:
the eccentric (6) has an inner eccentric region (22), an outer bearing ring (21), and a bearing (20) arranged between the inner eccentric region (22) and the outer bearing ring (21), and
the friction torque (13) is a result of internal friction in the bearing (20).

4. The device (1) as claimed in claim 1, wherein the at least one pump (2) has a drive unit (26), and the friction torque (13) is formed by internal friction in the drive unit (26).

5. The device (1) as claimed in claim 1, wherein the maximum pressure torque (14) is formed on the basis of a maximum working pressure of the at least one pump (2) and a maximum encountered cross section (25) of the delivery path (8) of the at least one pump (2).

6. The device (1) as claimed in claim 5, wherein the maximum cross section (25) of the delivery path (8) is smaller than 20 mm$^2$ [square millimeters].

7. The device (1) as claimed in claim 6, wherein the maximum working pressure of the at least one pump (2) is between 6 bar and 10 bar.

8. The device (1) as claimed in claim 1, wherein at least one selected from the group of the following parameters of the at least one pump (2) is configured such that the friction torque (13) is greater during movement of the eccentric (6) counter to the delivery direction (27) than during a movement of the eccentric (6) in the delivery direction (27):
a friction coefficient between a housing surface (15) of the pump housing that is directed toward the delivery path (8) and a diaphragm surface (34) of the deformable diaphragm (7) that is directed toward the delivery path (8);
a friction coefficient between the deformable diaphragm (7) and the eccentric (6);
a friction torque in a bearing (20) of the eccentric (6) of the at least one pump (2); and
a friction torque in a drive unit (26) of the at least one pump (2).

9. A motor vehicle (17) having an internal combustion engine (18), an exhaust-gas treatment device (16) configured to purify exhaust gases of the internal combustion engine (18), and a device (1), configured to deliver a liquid consisting of urea-water solution to the exhaust-gas treatment device (16), as claimed in claim 1.

10. A device (1) providing a dosed supply of a liquid, the device (1) comprising:

at least one pump (2) configured to deliver the liquid, the at least one pump (2) having a pump housing (3) with at least one inlet (4) and at least one outlet (5);

an eccentric (6) arranged on the pump housing (3); and a deformable diaphragm (7) arranged between the pump housing (3) and the eccentric (6), the deformable diaphragm (7) and the pump housing (3) delimiting at least one delivery path (8) from the at least one inlet (4) to the at least one outlet (5) and forming at least one seal (9) of the delivery path (8), wherein the at least one seal (9) is displaceable along the delivery path (8), by a movement of the eccentric (6), in a delivery direction (27) from the at least one inlet (4) to the at least one outlet (5) to deliver the liquid, wherein the at least one pump (2) is configured such that within the at least one pump (2) a friction torque (13) that must be overcome for the eccentric (6) to move is greater than a maximum pressure torque (14) that can be generated by pressurized liquid in the at least one delivery path (8), so as to prevent movement of the eccentric (6) counter to the delivery direction (27), and wherein, a barb structure (35) is provided at at least one position selected from the group of the following positions within the at least one pump (2), so as to have the effect that the friction torque (13) is greater counter to the delivery direction (27) than in the delivery direction (27):

on a housing surface (15), directed toward the delivery path (8), of the pump housing (3);

on a diaphragm surface (34), directed toward the delivery path (8), of the deformable diaphragm (7);

on a diaphragm surface, directed toward the eccentric (6), of the deformable diaphragm (7);

on a surface, directed toward the deformable diaphragm (7), of the eccentric (6);

in a bearing (20) of the eccentric (6) of the at least one pump (2); and in a drive unit (26) of the at least one pump (2).

* * * * *